US012254334B2

(12) United States Patent
Dechu et al.

(10) Patent No.: US 12,254,334 B2
(45) Date of Patent: Mar. 18, 2025

(54) BOOTSTRAPPING DYNAMIC ORCHESTRATION WORKFLOW

(71) Applicant: International Business Machines Corporation, Armonk, NY (US)

(72) Inventors: Sampath Dechu, Acton, MA (US); Kushal Mukherjee, New Delhi (IN); Neelamadhav Gantayat, Bangalore (IN); Naveen Eravimangalath Purushothaman, Thrissur (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/740,400

(22) Filed: May 10, 2022

(65) Prior Publication Data

US 2023/0367619 A1 Nov. 16, 2023

(51) Int. Cl.
*G06F 9/455* (2018.01)
*G06F 8/41* (2018.01)

(52) U.S. Cl.
CPC .......... *G06F 9/45512* (2013.01); *G06F 8/433* (2013.01)

(58) Field of Classification Search
CPC .............................. G06F 9/45512; G06F 8/433
USPC ........................................................ 717/115
See application file for complete search history.

(56) References Cited

U.S. PATENT DOCUMENTS

| | | | |
|---|---|---|---|
| 8,892,446 B2 | 11/2014 | Cheyer | |
| 10,388,285 B2 | 8/2019 | Hirzel | |
| 10,672,156 B2 * | 6/2020 | Simonovic | G06F 8/433 |
| 10,679,631 B2 | 6/2020 | Hirzel | |
| 11,099,893 B1 | 8/2021 | Kurtzer | |
| 2017/0013073 A1 * | 1/2017 | Mendez | H04L 67/141 |
| 2018/0131645 A1 | 5/2018 | Magliozzi | |
| 2020/0320978 A1 * | 10/2020 | Chatterjee | G10L 15/1822 |
| 2020/0326999 A1 | 10/2020 | Frech | |
| 2020/0364083 A1 * | 11/2020 | Walby | G06Q 10/0631 |
| 2021/0004746 A1 | 1/2021 | Voorhies | |
| 2021/0360083 A1 | 11/2021 | Duggal | |
| 2022/0019195 A1 * | 1/2022 | Yu | H04L 51/02 |
| 2022/0230113 A1 * | 7/2022 | Narayan | G06Q 10/06393 |

FOREIGN PATENT DOCUMENTS

EP    3005106 B1    9/2020

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Bradley A Teets
*Assistant Examiner* — Zengpu We
(74) *Attorney, Agent, or Firm* — Heather Johnston

(57) ABSTRACT

A system may include a memory and a processor in communication with the memory. The processor may be configured to perform operations. The operations may include receiving data and generating a contextual execution dependency graph with said data. The operations may include producing agents with said data and calculating an agent sequence for said agents based at least in part on said contextual execution dependency graph. The operations may include executing an automation script using said agent sequence and said contextual execution dependency graph.

20 Claims, 10 Drawing Sheets

BOOTSTRAPPING DYNAMIC ORCHESTRATION WORKFLOW

BACKGROUND

The present disclosure relates to digital conversational systems and more specifically to orchestration of digital conversational systems.

Various tools may be used to manually design conversational bots; conversational artifacts such as intents, entities, and/or dialog nodes may be used. Automation scripts may be used to provide one or more declarative definitions of scripts (e.g., automation scripts) that describe a sequence of tasks to perform a job. For every new task, the automation developer may either generate a new, custom automation script or manually execute multiple existing automation scripts. Manual design of such bots may be time consuming, involve intensive computation and human monitoring of the process, and result in a conversational bot of limited scope.

SUMMARY

Embodiments of the present disclosure include a system, method, and computer program product for bootstrapping dynamic orchestration workflow for stateful automation tasks.

A system in accordance with the present disclosure may include a memory and a processor in communication with the memory. The processor may be configured to perform operations. The operations may include receiving data and generating a contextual execution dependency graph with said data. The operations may include producing agents with said data and calculating an agent sequence for said agents based at least in part on said contextual execution dependency graph. The operations may include executing an automation script using said agent sequence and said contextual execution dependency graph.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
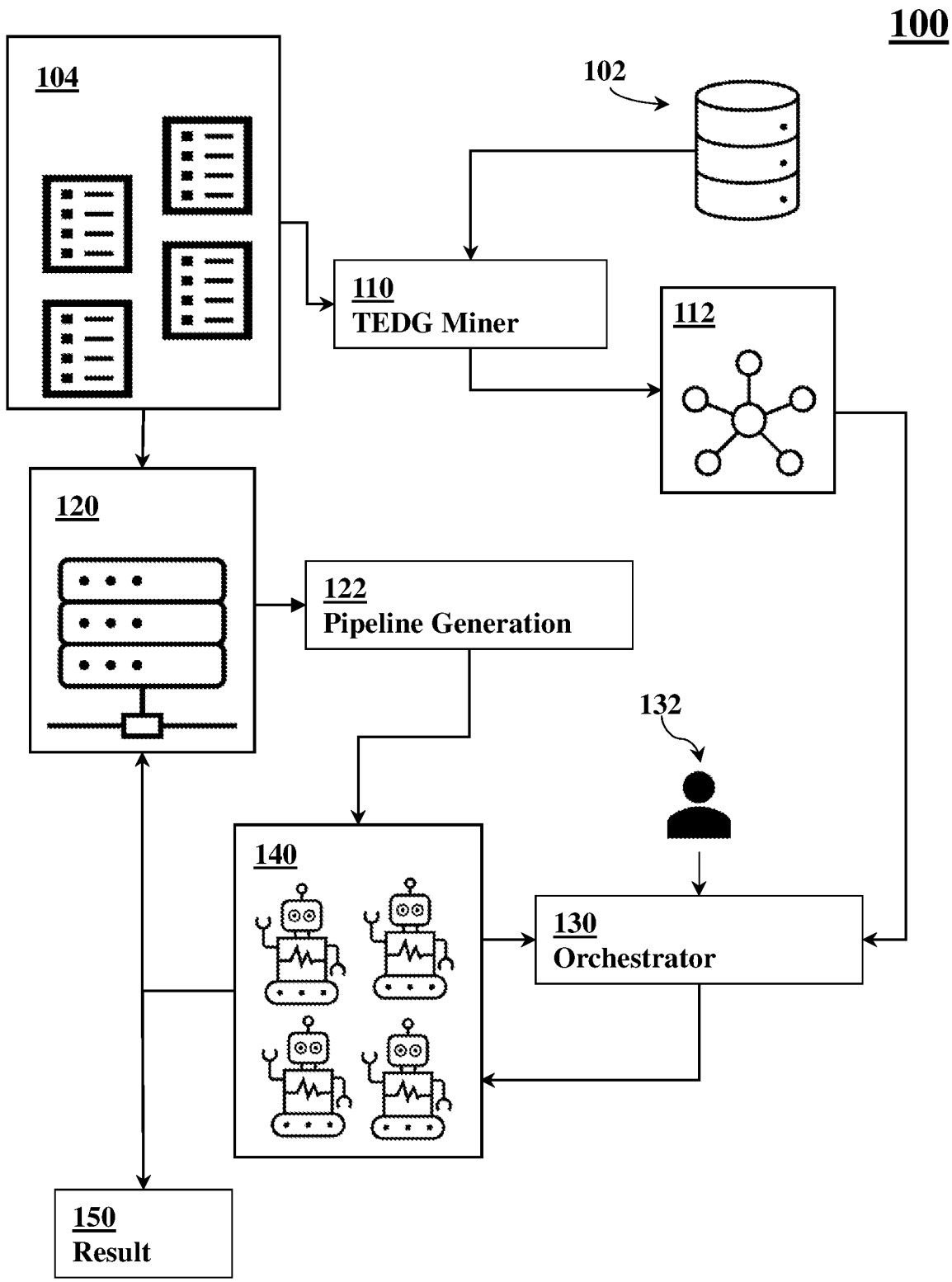
FIG. 1 illustrates a system for bootstrapping dynamic orchestration workflow in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital conversational systems and more specifically to orchestration of digital conversational systems. Aspects of the present disclosure may relate to conversational systems, goal-oriented dynamic stateful orchestration from natural language (NL) utterances, and/or automation of workflow generation.

Automation scripts may be used to provide one or more declarative definitions of scripts (e.g., automation scripts) that describe a sequence of tasks to perform a job. For every new task, the automation developer may either generate a new, custom automation script or manually execute multiple existing automation scripts. Such a setup may be rigid, and any modification may require a human developer in the loop. Understanding multiple pre-existing automation scripts and attaching a chat interface may enable a conversational, self-service automation tool.

In some embodiments of the present disclosure, ingestion of scripts (e.g., stateful automation scripts) may enable the generation of conversational agents; in some embodiments, the ingestion of the scripts may be automatic. Some embodiments of the present disclosure may enable generation of a conversational interface on top of the automation script. In some embodiments, the conversational interface may enable stateful orchestration of multiple automation scripts; in some embodiments, the conversational interface may generate new task sequences from existing automation scripts. In some embodiments of the present disclosure, the conversational interface may simultaneously enable stateful orchestration of multiple automation scripts and generate new task sequences from existing automation scripts.

In some embodiments of the present disclosure, a system may be used for bootstrapping dynamic orchestration workflow for stateful automation tasks.

Some embodiments of the present disclosure may include a method to generate a contextual execution dependency graph from stateful declarative automation task definitions, runtime execution logs, and supervised repairs. In some embodiments, the executional dependency graph may capture any dependencies between tasks present in declarative automation scripts. In some embodiments, the graph may be derived from variant-based process mining of step sequences in automation scripts (e.g., nested scripts) and/or user execution logs that capture the sequence of automation scripts executed.

Some embodiments of the present disclosure may include a method to bootstrap evaluator pipelines and actuator skills pipelines for declarative automation agents. In some embodiments, these pipelines may be derived from stateful declarative automation task definitions. In some embodiments, such a method may include identifying intent, entities, and sample utterances to invoke tasks from developer added artifacts, developer script comments, and/or artificial intelligence (AI) based discovery; tasks may be invoked based on, for example, module names. In some embodiments, such a method may include automatically generating digital agents or workers; an agent may be generated for each subtask and may execute its subtask by gathering the required resources from an executional context, from a developer, from a user, or the like. In some embodiments, such a method may include automatically constructing a payload; the payload may be based on, for example, domain knowledge. In some embodiments, such a method may include generating one or more additional skills pipelines within an agent actuation component; the additional pipelines may be used, for example, to conduct one or more status checks (e.g., for sync calls), approval flows, alerts based on metadata information, and the like.

Some embodiments of the present disclosure may include a method to infer a sequence of stateful automation agents for a given user goal based on contextual execution dependency graph. In some embodiments, the method may include identifying the sequence of state transitions and the associated agents that execute the task using the intents present in a user request matching a subset of agents as well as using the agents that perform the prerequisite tasks as determined by the executional dependency graph. In some embodiments, automation scripts (e.g., automation playbooks) for information technology operations (ITops) may require stateful execution (e.g., if any job executed changes the state of the system); the executional dependency graph may provide a set of feasible sequences for the stateful execution. In some embodiments, feedback (e.g., user feedback) about results (e.g., success or failure) may be leveraged to generate dependency conditioned on the results as recorded in the code, logs, or other information.

Some embodiments of the present disclosure may include generating an executional dependency graph, generating an agent for a task, and leveraging the executional dependency graph for a runtime orchestration framework.

In some embodiments, an executional dependency graph may be generated from one or more sets of declarative definition automation scripts.

In some embodiments, agent generation may include custom evaluation pipelines and/or custom actuator pipelines for each task. In some embodiments, agent generation may include identifying entities, intent, and sample utterances to invoke tasks from developed and added artifacts, code comments, and/or AI discovery. In some embodiments, the generated agents may be triggered when NL utterances from an end user matches the intent for its subtask and/or if the agents are able to execute the subtask (e.g., by gathering the required entities from either the executional context or an end user).

In some embodiments, integrating the agent generation into the tooling may enable a user (e.g., an end user) authoring a service to refine the generated NL interface and/or entities. In some embodiments, agent generation may include automated construction of one or more payloads based on domain knowledge (e.g., separation of parameters and extra variables). In some embodiments, agent generation may include one or more status checks, approval flows, and/or bootstrapping alert skills pipelines.

In some embodiments, leveraging the executional dependency graph for a runtime orchestration framework may include identifying a sequence of state transitions and the associated agents that execute the task to affect that change; the identification may include using the intents present in the end-user request that match a subset of agents and/or using inferred agents. Inferred agents may be the agents that perform prerequisite subtasks determined by the executional dependency graph.

In some embodiments, leveraging the executional dependency graph may be used to enable systems and programs (e.g., the Watson® Orchestrate) to use stateful execution rather than stateless execution (e.g., a representational state transfer (REST) application programming interface (API)). In some embodiments, automation scripts (e.g., automation playbooks) for ITops may require stateful executions (e.g., if the job changes the state of the system during its execution), and the executional dependency graph may provide a set of feasible sequences. In some embodiments, user feedback may be added as data into the executional dependency graph.

In some embodiments of the present disclosure, digital agents may be generated or bootstrapped from one or more existing automation systems by examining the scripts, automation scripts, and/or the associated metadata which may be found in, for example, job templates and/or workflow job templates.

In some embodiments of the present disclosure, the agents may be generated by identifying intent and/or entities from user-added artifacts and/or AI-based discovery from automation scripts. Some embodiments of the present disclosure may include the generation of additional skills in the pipeline with agent actuation based on metadata information, for example, for status checks (e.g., for async calls), approval flows, and/or alerts.

In some embodiments of the present disclosure, user feedback may be integrated. The user feedback may be from a user (e.g., an end user and/or a developer) and may include, for example, information pertaining to supervised repairs; such information may be included into the orchestration automatically (e.g., repair information may be automatically included when a failure is resolved). The feedback may be leveraged to generate dependency conditioned on failure code, information, and/or logs (e.g., to involve a user in the loop).

A system in accordance with the present disclosure may include a memory and a processor in communication with the memory. The processor may be configured to perform operations. The operations may include receiving data and generating a contextual execution dependency graph with said data. The operations may include producing agents with said data and calculating an agent sequence for said agents based at least in part on said contextual execution dependency graph. The operations may include executing an automation script using said agent sequence and said contextual execution dependency graph.

In some embodiments of the present disclosure, the contextual execution dependency graph may be generated using stateful declarative automation task definitions, runtime execution logs, and/or supervised repair information.

In some embodiments of the present disclosure, the automation script may be a stateful execution automation script. In some embodiments, the automation script may be an automation playbook. In some embodiments, the automation script may use stateful execution task history so as to anticipate one or more changes to the state of the system a task is executed in. In some embodiments, the contextual execution dependency graph may provide a set of feasible sequences based in part on the anticipated one or more changes to the state of the system based on the task to be executed; the contextual execution dependency graph may be used in developing the automation script so as to consider anticipated changes to the state of the system. In some embodiments, the automation script may be developed for use by ITops.

In some embodiments of the present disclosure, the operations may include deriving declarative automation scripts from the execution logs and including the declarative automation scripts in the data.

In some embodiments, the operations may further include capturing automation scripts in the execution logs. In some embodiments, the declarative automation scripts may be derived from variant-based process mining of one or more sequences of steps in the automation scripts; in some embodiments, automation scripts used for the variant-based process mining may include nested scripts.

In some embodiments of the present disclosure, the producing agents operation may include identifying intent, entities, and sample utterances in a source. The source may include artifacts, script comments, and/or artificial intelligence discovery information.

In some embodiments of the present disclosure, the operations may include providing a skills pipeline for the agents. In some embodiments, the skills pipeline may be constructed from stateful declarative automation task definitions. In some embodiments, the agents may be declarative automation agents. In some embodiments, the skills pipeline may be an actuator skills pipeline. In some embodiments, the skills pipeline may be an evaluator pipeline. In some embodiments, the skills pipeline may include one or more bootstrap evaluator and actuator skills pipelines. In some embodiments, the skills pipeline may be constructed within agent actuation. In some embodiments, the skills pipeline may enable a task or subtask status check (e.g., for sync calls), an approval flow, and/or alerts based on metadata.

In some embodiments of the present disclosure, the operations may include identifying intents in a request and matching the intents to at least one of the agents based on the contextual execution dependency graph.

In some embodiments of the present disclosure, the operations may include correlating a sequence of state transitions with the agent sequence. In some embodiments, intents identified in a request may be used to correlate the sequence of state transitions with the agent sequence. In some embodiments, at least one of the agents may perform prerequisite subtasks as determined by the contextual execution dependency graph.

In some embodiments of the present disclosure, the operations may include providing a set of feasible sequences of execution of a task in a system in the contextual execution dependency graph.

In some embodiments of the present disclosure, the operations may include constructing a payload based on domain knowledge. In some embodiments, the domain knowledge may be sourced from an open-source tool (e.g., Ansible). In some embodiments, the payload may be constructed automatically. In some embodiments, the domain knowledge may include separation of parameters, variables, and/or extra variables.

In some embodiments of the present disclosure, the agents may be produced automatically. In some embodiments of the present disclosure, the agents may be digital worker agents. In some embodiments, each of the agents may be generated for a subtask; in some embodiments, each agent may be generated for a particular subtask. In some embodiments, the agents may execute their tasks or subtasks by gathering the required entities from an executional context and/or a user (e.g., a developer and/or an end user).

In some embodiments of the present disclosure, the agent sequence may be calculated for a goal. In some embodiments, the goal may be a specific goal. In some embodiments, the goal may be selected by a user (e.g., a developer and/or an end user).

FIG. 1 illustrates a system 100 for bootstrapping dynamic orchestration workflow in accordance with some embodiments of the present disclosure. The system 100 includes inputs from a database 102, automation scripts 104, and a user 132 to generate and/or direct digital agents 140 to execute a task.

Data in the database 102 may include automation user logs. The database 102 may submit the data to a task execution dependency graph (TEDG) miner 110. Automation scripts 104, which may include declarative definitions of automation scripts, may also be submitted to the TEDG miner 110. The TEDG miner 110 may use the data from the database 102 (e.g., the automation user logs) and the automation scripts 104 (e.g., the declarative definition of automation scripts) to generate an executional dependency graph 112. The executional dependency graph 112 may be submitted to an orchestrator 130.

The automation scripts 104 may also be submitted to an automation platform 120. The automation platform 120 may engage in pipeline generation 122 using the automation scripts 104. Agents involved in the pipeline generation 122 may evaluate the request and actuate a response. The agents may evaluate the request of the automation platform 120 to identify whether the resources are available to generate digital agents 140 for the request. The pipeline generation 122 agents may evaluate that the resources are available and may actuate the pipeline generation 122 to generate the digital agents 140.

A user 132 may submit a request or inquiry to the orchestrator 130. The request may be a NL request such that the orchestrator 130 would use a NL processing system (such as the natural language processing system 712 of FIG. 7) to parse the request. The request from the user 132 may activate the orchestrator 130 to communicate with the digital agents 140 and direct the digital agents 140 to respond. The response of the digital agents 140 may be based on an NL evaluation of the particular request and the confidence of each of the digital agents 140 with respect to its ability to actuate a proper response to the request from the user 132. The digital agents 140 may respond with their respective confidence levels regarding the likelihood of properly responding to the request and/or parts of the request. The orchestrator 130 may direct the digital agents 140 to actuate the request from the user 132.

The request from the user 132 may have one or more components. The digital agents 140 may be able to handle an entire request, components thereof, either, or both. The orchestrator 130 may direct individual digital agents 140 to respond to the request or specific components thereof. For example, the orchestrator 130 may direct one of the digital agents 140 to respond to a first request and three digital agents 140 to respond to various components of a second request. The orchestrator 130 may direct a sequenced order of actuation of a request with (or separated into) multiple components; the orchestrator 130 may direct which of the digital agents 140 will execute each component of the request as well as the order of execution of each of the components by their respective digital agents 140.

The digital agents 140 may execute the request as directed by the orchestrator 130. The digital agents 140 may submit a result 150 from the request to the automation platform 120 and/or to a display for the user 132.

Figure 2:
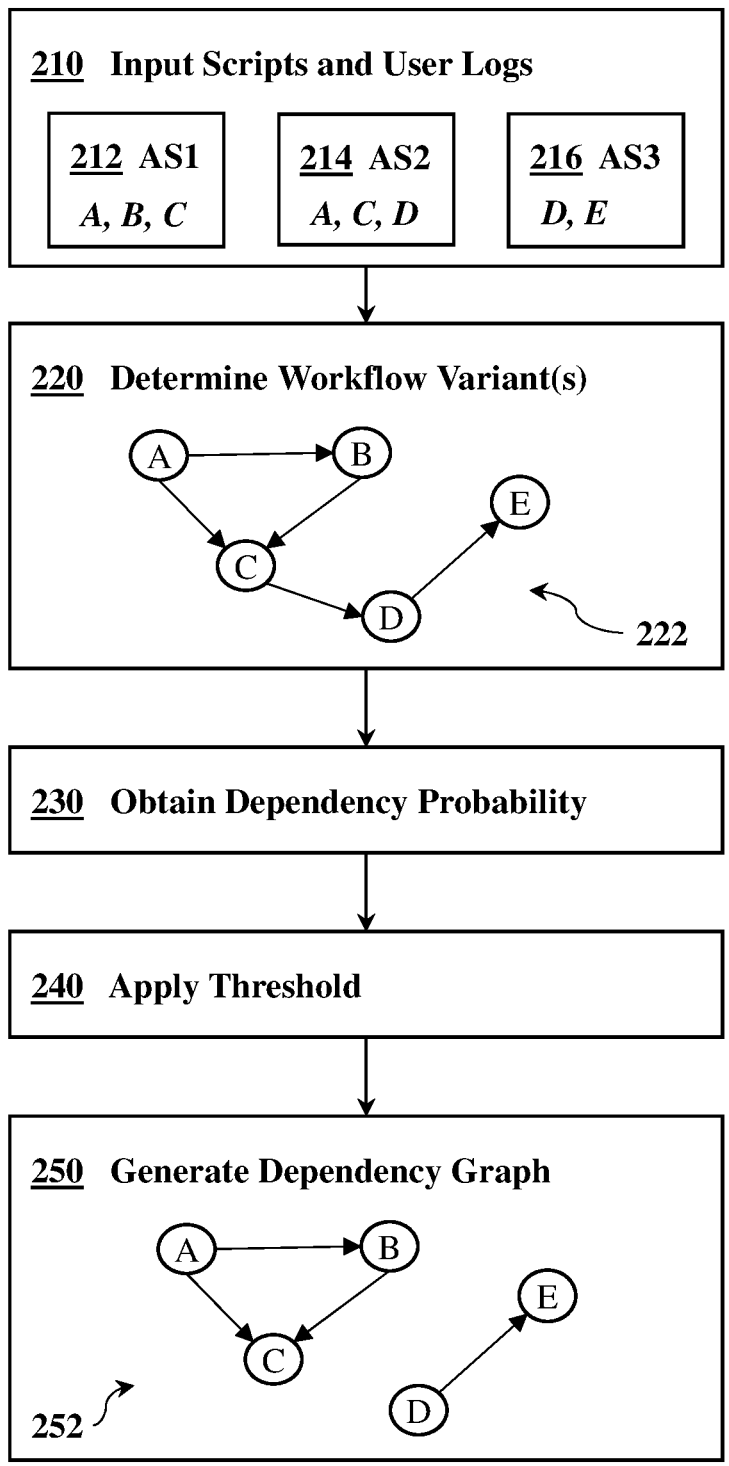
FIG. 2 depicts a method for generation of an executional dependency graph in accordance with some embodiments of the present disclosure.

FIG. 2 depicts a method 200 for generation of an executional dependency graph in accordance with some embodiments of the present disclosure. The method 200 includes inputting 210 scripts and user logs, determining 220 one or more workflow variants, obtaining 230 dependency probability, applying 240 a threshold, and generating 250 a dependency graph 252.

The scripts in the inputting 210 operation may include one or more automation scripts 212, 214, and 216. The automation scripts 212, 214, and 216 may each include instructions for one or more tasks; for example, a first automation script 212 may have instructions for tasks A, B, and C, a second automation script 214 may have instructions for tasks A, C, and D, and a third automation script 216 may have instructions for tasks D and E. The user logs may include one or more scripts that each user has run; for example, a first user may have run the first automation script 212 (e.g., tasks A, B, and C) as well as the third automation script 216 (e.g., tasks D and E), a second user may have run the second automation script 214 (e.g., tasks A, C, and D), a third user may have run the third automation script 216, and a fourth user may have run the first automation script 212 and the third automation script 216.

The one or more workflow variants in the determining 220 operation may identify and/or map how tasks are related; for example, in the first automation script, tasks A, B, and C are related as the tasks are all in the first automation script 212; the relation may be described via the order in which the tasks are performed. All of the automation scripts may be identified and/or mapped together to identify inter-relationships. For example, task C is common to the first and second automation scripts 212 and 214, task D is common to the second and third automation scripts 214 and 216, and task A may precede either task B or task C; an automation workflow variant map 222 for these automation scripts may, for example, connect task A to both task B and task C, task C to task D, and task D to task E.

In some embodiments of the present disclosure, one or more of the workflow variants in the determining 220 operation may be automation workflow variants.

The obtaining 230 the dependency probability may include determining the probability that one task is executed before another task. This probability may be calculated using Equation 1:

$$P(T_1,T_2)=\Sigma_i P(T_1(s<i),T_2(i)) \quad \text{Equation 1:}$$

wherein P is probability, $T_1$ is the first task, $T_2$ is the second task, and s is a step. The applying 240 the threshold operation may include applying 240 a threshold R to the probability calculation (e.g., obtained using Equation 1) to obtain an artifact graph G. The threshold application may be expressed as shown in Equation 2:

$$G(T_1,T_2)=1 \text{ if } P(T_1,T_2)>R, \text{ else } G(T_1,T_2)=0 \quad \text{Equation 2:}$$

wherein G is an artifact graph and R is a threshold. G may be an artifact graph such that if a dependency exists between first task $T_1$ and second task $T_2$, then G is equal to one, and if no such dependency exists between first task $T_1$ and second task $T_2$, then G is equal to zero. In some embodiments, if G is equal to one, then first task $T_1$ is a prerequisite of second task $T_2$, and if G is equal to zero, then first task $T_1$ is not a prerequisite of second task $T_2$.

Applying 240 the threshold to the artifact graph G may result in generating 250 the dependency graph 252. The dependency graph 252 may show which tasks are prerequisites of which other tasks and/or which tasks have no prerequisites.

Figure 3:
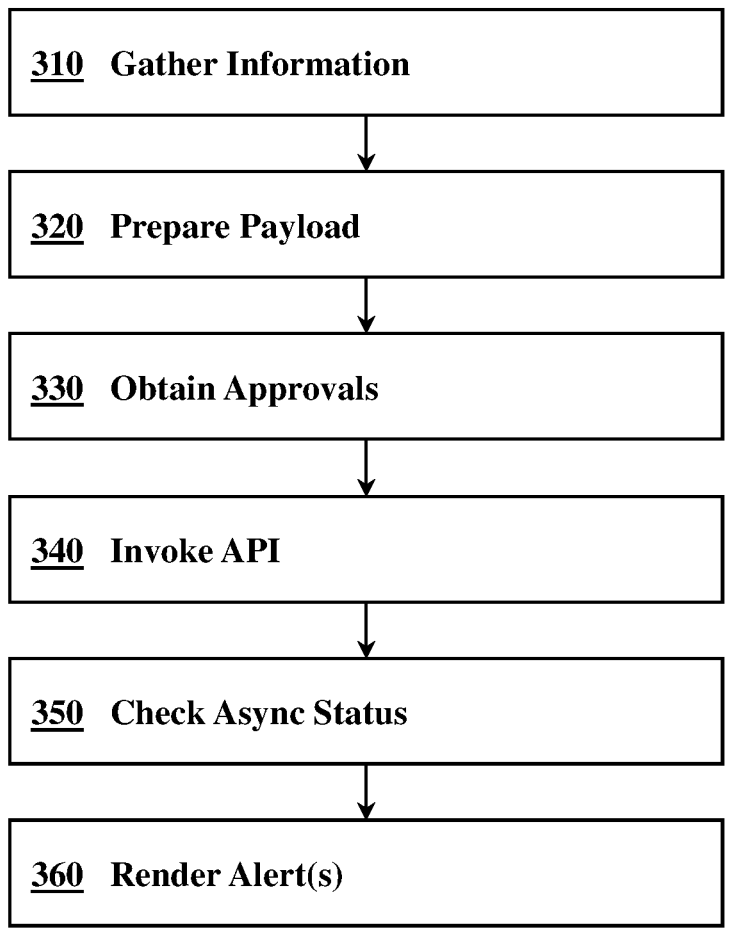
FIG. 3 illustrates a method for agent evaluation and actuation pipeline generation in accordance with some embodiments of the present disclosure.

FIG. 3 illustrates a method 300 for agent evaluation and actuation pipeline generation in accordance with some embodiments of the present disclosure. The method 300 includes gathering 310 information, preparing 320 a payload, obtaining 330 approvals, invoking 340 an application programming interface (API), checking 350 async status, and rendering 360 any applicable alerts.

Gathering 310 information may include gathering 310, for example, a job template description, one or more task names, other artifacts (e.g., artifacts used to generate NL intent classification models), automation script variables, variables from extra-variant fields (e.g., user provided fields, filled out form information, entities from user input extraction, context received from a previous task, and the like. Information may be gathered by an agent such as, for example, a digital agent.

Preparing 320 the payload may include, for example, determining which parameters are reserved and which parameters are not reserved.

Obtaining 330 approvals may include, for example, obtaining the email identification of an approver. Obtaining 330 approvals and/or related information may be based on metadata.

Checking 350 async status may include watching the async status for updates (e.g., real time status changes to the async status).

Rendering 360 applicable alerts may include, for example, obtaining alerting addresses (e.g., addresses corresponding to error codes) which may be provided by a user (e.g., a developer or an end user). Rendering 360 applicable alerts may, for example, result in zero alerts (e.g., there are no applicable alerts), one alert, or multiple alerts.

Figure 4:
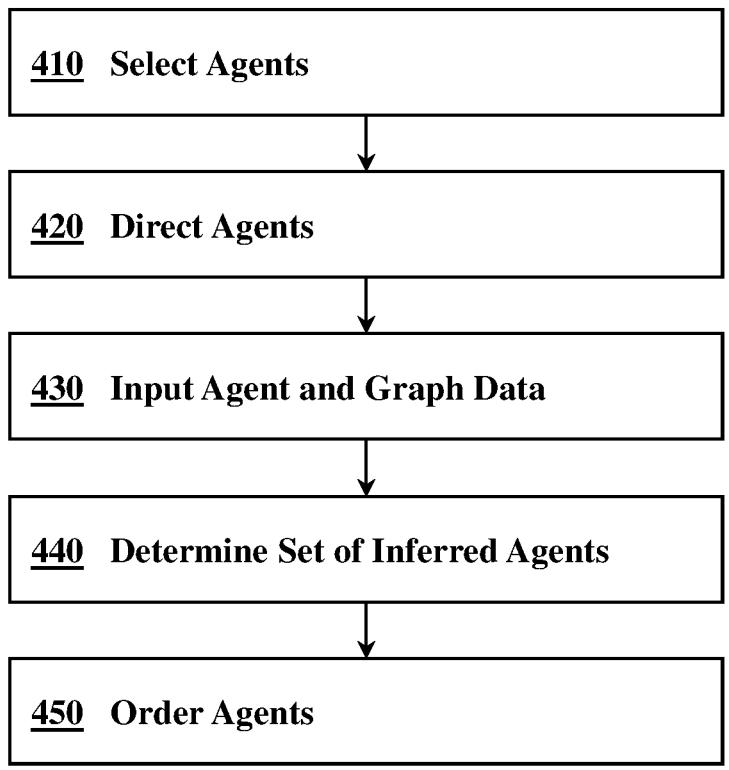
FIG. 4 depicts a method for identifying a sequence of agents in accordance with some embodiments of the present disclosure.

FIG. 4 depicts a method 400 for identifying a sequence of agents in accordance with some embodiments of the present disclosure. The method 400 includes selecting 410 agents with an orchestrator (e.g., orchestrator 130 of FIG. 1) and directing 420 the agents based on the intent of a user query as parsed by a NL processor (e.g., natural language processing system 712 of FIG. 7); the intent of the user query may be assessed using confidence scores.

The method 400 includes inputting 430 data into a system (e.g., system 100 of FIG. 1). The data input into the system may include agent data (e.g., agent selection, direction to agents, and/or confidence scores) and graph data (e.g., an execution dependency graph such as the dependency graph 252 of FIG. 2).

The method 400 includes determining 440 a set of inferred agents. Determining 440 inferred agents may consider, for example, the dependencies of each direct agent. The method 400 includes ordering 450 the agents; the agents may be ordered based on both direct data (e.g., an established fact that A happens before B) as well as inferred data (e.g., an assessment based on an execution dependency graph that D most likely occurs after A and before B). Ordering 450 the agents may use an algorithm based on topological ordering using a directed acyclic graph (DAG) and use, for example, Kahn's topological sorting algorithm.

A method in accordance with some embodiments of the present disclosure may include receiving data and generating a contextual execution dependency graph with the data. The method may include producing agents with the data and calculating an agent sequence for the agents based at least in part on the contextual execution dependency graph. The method may include executing an automation script using the agent sequence and the contextual execution dependency graph.

In some embodiments of the present disclosure, the contextual execution dependency graph may be generated using stateful declarative automation task definitions, runtime execution logs, and/or supervised repair information.

In some embodiments of the present disclosure, the automation script may be a stateful execution automation script. In some embodiments, the automation script may be an automation playbook. In some embodiments, the automation script may use stateful execution task history so as to anticipate one or more changes to the state of the system a task is executed in. In some embodiments, the contextual execution dependency graph may provide a set of feasible sequences based in part on the anticipated one or more changes to the state of the system based on the task to be executed; the contextual execution dependency graph may be used in developing the automation script so as to consider anticipated changes to the state of the system. In some embodiments, the automation script may be developed for use by ITops.

In some embodiments of the present disclosure, the method may include deriving declarative automation scripts from the execution logs and including the declarative automation scripts in the data.

In some embodiments, the method may further include capturing automation scripts in the execution logs. In some embodiments, the declarative automation scripts may be derived from variant-based process mining of one or more sequences of steps in the automation scripts; in some embodiments, automation scripts used for the variant-based process mining may include nested scripts.

In some embodiments of the present disclosure, the producing agents operation may include identifying intent, entities, and sample utterances in a source. The source may include artifacts, script comments, and/or artificial intelligence discovery information.

In some embodiments of the present disclosure, the method may include providing a skills pipeline for the agents. In some embodiments, the skills pipeline may be constructed from stateful declarative automation task definitions. In some embodiments, the agents may be declarative automation agents. In some embodiments, the skills pipeline may be an actuator skills pipeline. In some embodiments, the skills pipeline may be an evaluator pipeline. In some embodiments, the skills pipeline may include one or more bootstrap evaluator and actuator skills pipelines. In some embodiments, the skills pipeline may be constructed within agent actuation. In some embodiments, the skills pipeline may enable a task or subtask status check (e.g., for sync calls), an approval flow, and/or alerts based on metadata.

In some embodiments of the present disclosure, the method may include identifying intents in a request and matching the intents to at least one of the agents based on the contextual execution dependency graph.

In some embodiments of the present disclosure, the method may include correlating a sequence of state transitions with the agent sequence. In some embodiments, intents identified in a request may be used to correlate the sequence of state transitions with the agent sequence. In some embodiments, at least one of the agents may perform prerequisite subtasks as determined by the contextual execution dependency graph.

In some embodiments of the present disclosure, the method may include providing a set of feasible sequences of execution of a task in a system in the contextual execution dependency graph.

In some embodiments of the present disclosure, the method may include constructing a payload based on domain knowledge. In some embodiments, the domain knowledge may be sourced from an open-source tool (e.g., Ansible). In some embodiments, the payload may be constructed automatically. In some embodiments, the domain knowledge may include separation of parameters, variables, and/or extra variables.

In some embodiments of the present disclosure, the agents may be produced automatically. In some embodiments of the present disclosure, the agents may be digital worker agents. In some embodiments, each of the agents may be generated for a subtask; in some embodiments, each agent may be generated for a particular subtask. In some embodiments, the agents may execute their tasks or subtasks by gathering the required entities from an executional context and/or a user (e.g., a developer and/or an end user).

In some embodiments of the present disclosure, the agent sequence may be calculated for a goal. In some embodiments, the goal may be a specific goal. In some embodiments, the goal may be selected by a user (e.g., a developer and/or an end user).

Figure 5:
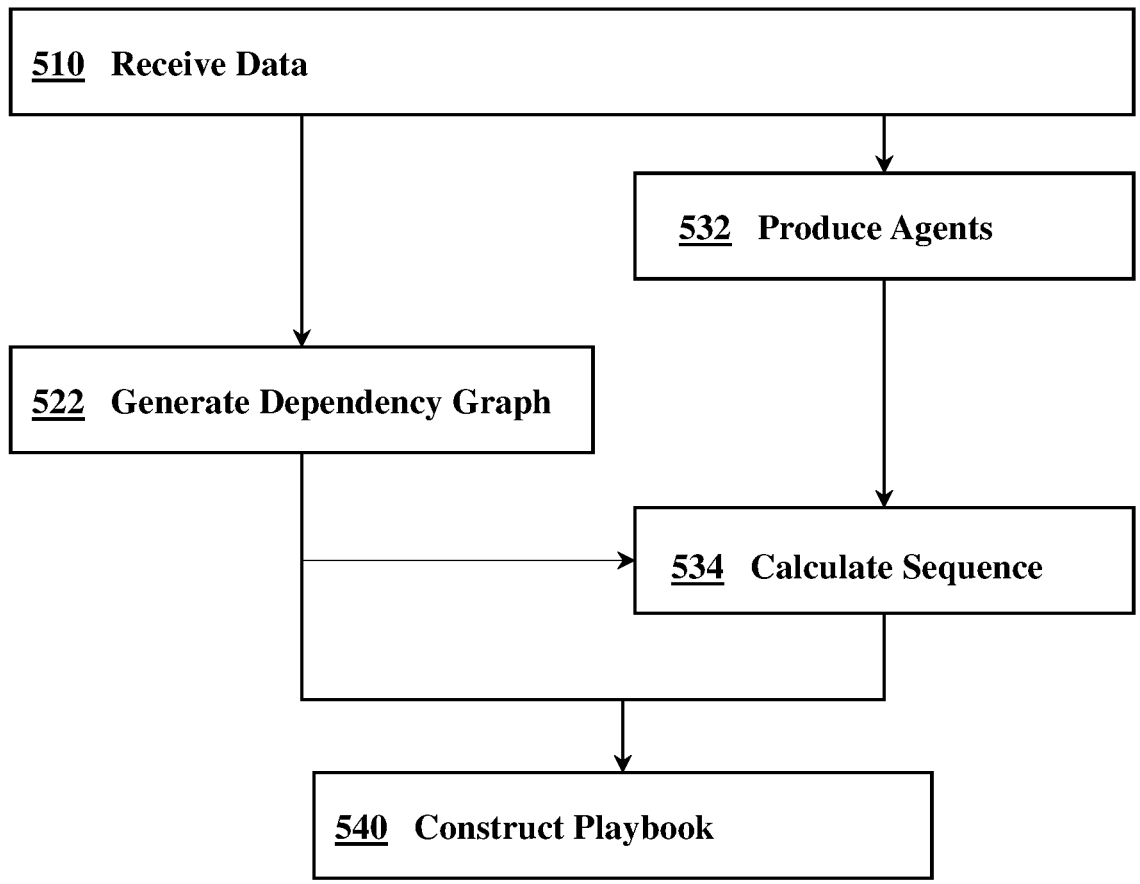
FIG. 5 illustrates a method for dynamic orchestration workflow in accordance with some embodiments of the present disclosure.

FIG. 5 illustrates a method 500 for dynamic orchestration workflow in accordance with some embodiments of the present disclosure. The method 500 may be performed by a system for bootstrapping dynamic orchestration workflow (such as system 100 of FIG. 1).

The method 500 includes receiving 510 data. The data may include, for example, automation scripts, user logs, stateful declarative automation task definitions, runtime execution logs, supervised repair logs, task dependency information, variant-based process mining sequence step data, automation script sequence data, artifacts, script comments, intent data, entity data, sample utterances, training data, domain knowledge, parameters, variables, alert information, query data, automation scripts (e.g., automation playbooks), developer-supplied content, AI-supplied content, and the like.

The method 500 includes generating 522 a dependency graph (such as dependency graph 252 of FIG. 2) with the data; in some embodiments, the dependency graph may be a contextual execution dependency graph. The method 500 includes producing 532 agents with the data. The method 500 includes calculating 534 an agent sequence for the agents; the calculating 534 may incorporate information from the dependency graph. The method 500 includes constructing 540 an automation script (e.g., a sequence of automation scripts tailored to a user inquiry) based on the dependency graph and the calculated sequence.

A computer program product in accordance with some embodiments of the present disclosure may include a computer readable storage medium having program instructions embodied therewith. The program instructions may be executable by a processor to cause the processor to perform a function. The function may include receiving data and generating a contextual execution dependency graph with said data. The function may include producing agents with said data and calculating an agent sequence for said agents based at least in part on said contextual execution dependency graph. The function may include executing an automation script using said agent sequence and said contextual execution dependency graph.

In some embodiments of the present disclosure, the contextual execution dependency graph may be generated using stateful declarative automation task definitions, runtime execution logs, and/or supervised repair information.

In some embodiments of the present disclosure, the automation script may be a stateful execution automation script. In some embodiments, the automation script may be an automation playbook. In some embodiments, the automation script may use stateful execution task history so as to anticipate one or more changes to the state of the system a task is executed in. In some embodiments, the contextual execution dependency graph may provide a set of feasible sequences based in part on the anticipated one or more changes to the state of the system based on the task to be executed; the contextual execution dependency graph may be used in developing the automation script so as to consider anticipated changes to the state of the system. In some embodiments, the automation script may be developed for use by ITops.

In some embodiments of the present disclosure, the function may include deriving declarative automation scripts from the execution logs and including the declarative automation scripts in the data.

In some embodiments, the function may further include capturing automation scripts in the execution logs. In some embodiments, the declarative automation scripts may be derived from variant-based process mining of one or more sequences of steps in the automation scripts; in some embodiments, automation scripts used for the variant-based process mining may include nested scripts.

In some embodiments of the present disclosure, the producing agents operation may include identifying intent, entities, and sample utterances in a source. The source may include artifacts, script comments, and/or artificial intelligence discovery information.

In some embodiments of the present disclosure, the function may include providing a skills pipeline for the agents. In some embodiments, the skills pipeline may be constructed from stateful declarative automation task definitions. In some embodiments, the agents may be declarative automation agents. In some embodiments, the skills pipeline may be an actuator skills pipeline. In some embodiments, the skills pipeline may be an evaluator pipeline. In some embodiments, the skills pipeline may include one or more bootstrap evaluator and actuator skills pipelines. In some embodiments, the skills pipeline may be constructed within agent actuation. In some embodiments, the skills pipeline may enable a task or subtask status check (e.g., for sync calls), an approval flow, and/or alerts based on metadata.

In some embodiments of the present disclosure, the function may include identifying intents in a request and matching the intents to at least one of the agents based on the contextual execution dependency graph.

In some embodiments of the present disclosure, the function may include correlating a sequence of state transitions with the agent sequence. In some embodiments, intents identified in a request may be used to correlate the sequence of state transitions with the agent sequence. In some embodiments, at least one of the agents may perform prerequisite subtasks as determined by the contextual execution dependency graph.

In some embodiments of the present disclosure, the function may include providing a set of feasible sequences of execution of a task in a system in the contextual execution dependency graph.

In some embodiments of the present disclosure, the function may include constructing a payload based on domain knowledge. In some embodiments, the domain knowledge may be sourced from an open-source tool (e.g., Ansible). In some embodiments, the payload may be constructed automatically. In some embodiments, the domain knowledge may include separation of parameters, variables, and/or extra variables.

In some embodiments of the present disclosure, the agents may be produced automatically. In some embodiments of the present disclosure, the agents may be digital worker agents. In some embodiments, each of the agents may be generated for a subtask; in some embodiments, each agent may be generated for a particular subtask. In some embodiments, the agents may execute their tasks or subtasks by gathering the required entities from an executional context and/or a user (e.g., a developer and/or an end user).

In some embodiments of the present disclosure, the agent sequence may be calculated for a goal. In some embodiments, the goal may be a specific goal. In some embodiments, the goal may be selected by a user (e.g., a developer and/or an end user).

Figure 6:
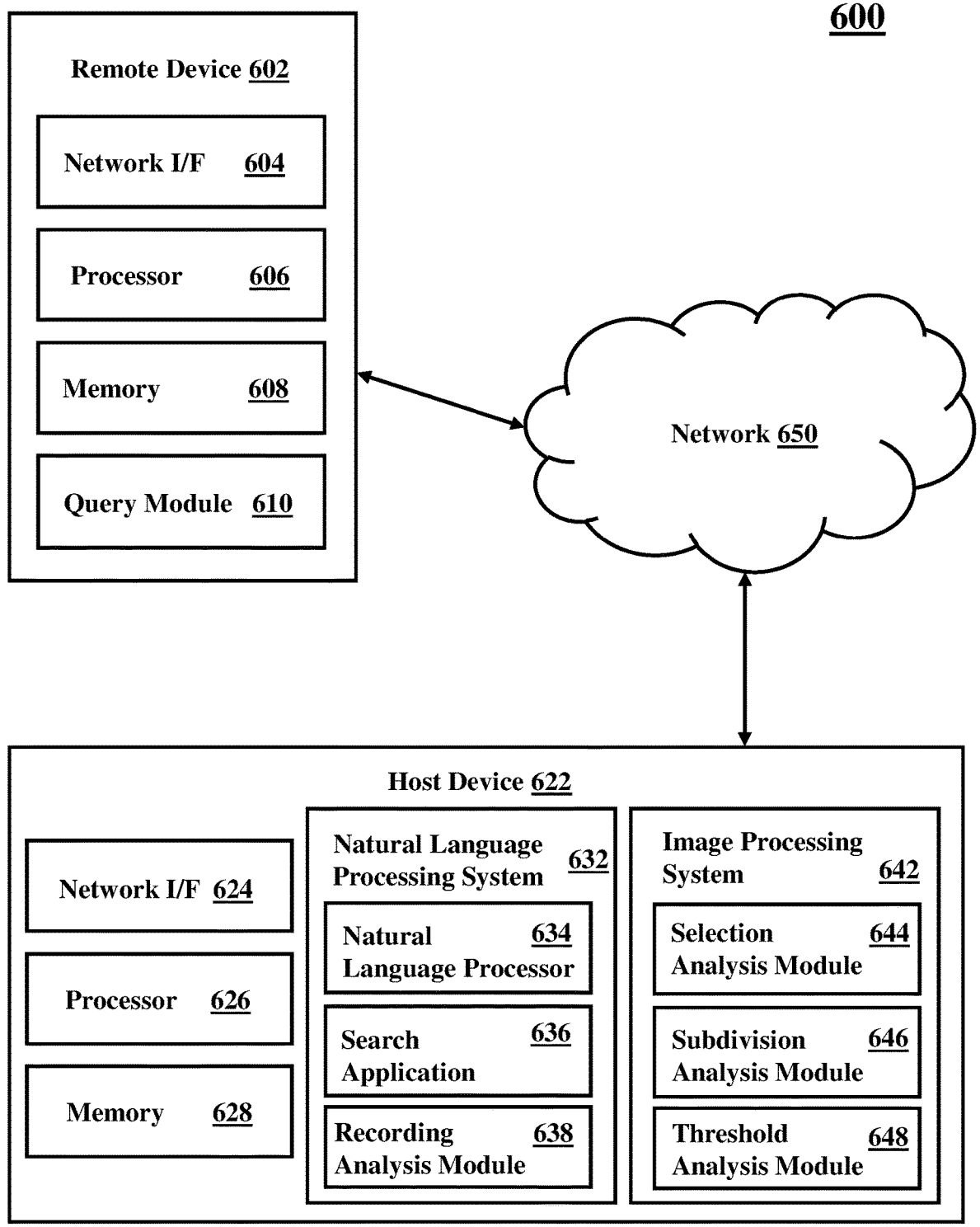
FIG. 6 illustrates a block diagram of an example computing environment in which illustrative embodiments of the present disclosure may be implemented.

Some embodiments of the present disclosure may utilize a natural language parsing and/or subparsing component. Thus, aspects of the disclosure may relate to natural language processing. Accordingly, an understanding of the embodiments of the present invention may be aided by describing embodiments of natural language processing systems and the environments in which these systems may operate. Turning now to FIG. 6, illustrated is a block diagram of an example computing environment 600 in which illustrative embodiments of the present disclosure may be implemented. In some embodiments, the computing environment 600 may include a remote device 602 and a host device 622.

Consistent with various embodiments of the present disclosure, the host device 622 and the remote device 602 may be computer systems. The remote device 602 and the host device 622 may include one or more processors 606 and 626 and one or more memories 608 and 628, respectively. The remote device 602 and the host device 622 may be configured to communicate with each other through an internal or external network interface 604 and 624. The network interfaces 604 and 624 may be modems or network interface cards. The remote device 602 and/or the host device 622 may be equipped with a display such as a monitor. Additionally, the remote device 602 and/or the host device 622 may include optional input devices (e.g., a keyboard, mouse, scanner, or other input device) and/or any commercially available or custom software (e.g., browser software, communications software, server software, natural language processing software, search engine and/or web crawling software, filter modules for filtering content based upon predefined parameters, etc.). In some embodiments, the remote device 602 and/or the host device 622 may be servers, desktops, laptops, or hand-held devices.

The remote device 602 and the host device 622 may be distant from each other and communicate over a network 650. In some embodiments, the host device 622 may be a central hub from which remote device 602 can establish a communication connection, such as in a client-server networking model. Alternatively, the host device 622 and remote device 602 may be configured in any other suitable networking relationship (e.g., in a peer-to-peer configuration or using any other network topology).

In some embodiments, the network 650 can be implemented using any number of any suitable communications media. For example, the network 650 may be a wide area network (WAN), a local area network (LAN), an Internet, or an intranet. In certain embodiments, the remote device 602 and the host device 622 may be local to each other and communicate via any appropriate local communication medium. For example, the remote device 602 and the host device 622 may communicate using a local area network (LAN), one or more hardwire connections, a wireless link or router, or an intranet. In some embodiments, the remote device 602 and the host device 622 may be communicatively coupled using a combination of one or more networks and/or one or more local connections. For example, the remote device 602 may be hardwired to the host device 622 (e.g., connected with an Ethernet cable) or the remote device 602 may communicate with the host device using the network 650 (e.g., over the Internet).

In some embodiments, the network 650 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 650.

In some embodiments, the remote device 602 may enable a user to input (or may input automatically with or without a user) a query (e.g., is any part of a recording artificial, etc.) to the host device 622 in order to identify subdivisions of a recording that include a particular subject. For example, the remote device 602 may include a query module 610 and a user interface (UI). The query module 610 may be in the form of a web browser or any other suitable software module, and the UI may be any type of interface (e.g., command line prompts, menu screens, graphical user interfaces). The UI may allow a user to interact with the remote device 602 to input, using the query module 610, a query to the host device 622, which may receive the query.

In some embodiments, the host device 622 may include a natural language processing system 632. The natural language processing system 632 may include a natural language processor 634, a search application 636, and a recording analysis module 638. The natural language processor 634 may include numerous subcomponents, such as a tokenizer, a part-of-speech (POS) tagger, a semantic relationship identifier, and a syntactic relationship identifier. An example natural language processor is discussed in more detail in reference to FIG. 7.

The search application 636 may be implemented using a conventional or other search engine and may be distributed across multiple computer systems. The search application 636 may be configured to search one or more databases (e.g., repositories) or other computer systems for content that is related to a query submitted by the remote device 602. For example, the search application 636 may be configured to search dictionaries, papers, and/or archived reports to help identify a particular subject related to a query provided for a class. The recording analysis module 638 may be configured to analyze a recording to identify a particular subject (e.g., of the query). The recording analysis module 638 may include one or more modules or units, and may utilize the search application 636, to perform its functions (e.g., to identify a particular subject in a recording), as discussed in more detail in reference to FIG. 7.

In some embodiments, the host device 622 may include an image processing system 642. The image processing system 642 may be configured to analyze images associated with a recording to create an image analysis. The image processing system 642 may utilize one or more models, modules, or units to perform its functions (e.g., to analyze the images associated with the recording and generate an image analysis). For example, the image processing system 642 may include one or more image processing models that are configured to identify specific images related to a recording. The image processing models may include a section analysis module 644 to analyze single images associated with the recording and to identify the location of one or more features of the single images. As another example, the image processing system 642 may include a subdivision analysis module 646 to group multiple images together identified to have a common feature of the one or more features. In some embodiments, image processing modules may be implemented as software modules. For example, the image processing system 642 may include a section analysis module and a subdivision analysis module. In some embodiments, a single software module may be configured to analyze the image(s) using image processing models.

In some embodiments, the image processing system 642 may include a threshold analysis module 648. The threshold analysis module 648 may be configured to compare the instances of a particular subject identified in a subdivision of sections of the recording against a threshold number of instances. The threshold analysis module 648 may then determine if the subdivision should be displayed to a user.

In some embodiments, the host device may have an optical character recognition (OCR) module. The OCR module may be configured to receive a recording sent from the remote device 602 and perform optical character recognition (or a related process) on the recording to convert it into machine-encoded text so that the natural language processing system 632 may perform NLP on the report. For example, a remote device 602 may transmit a video of a medical procedure to the host device 622. The OCR module may convert the video into machine-encoded text and then the converted video may be sent to the natural language processing system 632 for analysis. In some embodiments, the OCR module may be a subcomponent of the natural language processing system 632. In other embodiments, the OCR module may be a standalone module within the host device 622. In still other embodiments, the OCR module may be located on the remote device 602 and may perform OCR on the recording before the recording is sent to the host device 622.

While FIG. 6 illustrates a computing environment 600 with a single host device 622 and a remote device 602, suitable computing environments for implementing embodiments of this disclosure may include any number of remote devices and host devices. The various models, modules, systems, and components illustrated in FIG. 6 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS to generate an image analysis.

It is noted that FIG. 6 is intended to depict the representative major components of an exemplary computing environment 600. In some embodiments, however, individual components may have greater or lesser complexity than as represented in FIG. 6, components other than or in addition to those shown in FIG. 6 may be present, and the number, type, and configuration of such components may vary.

Figure 7:
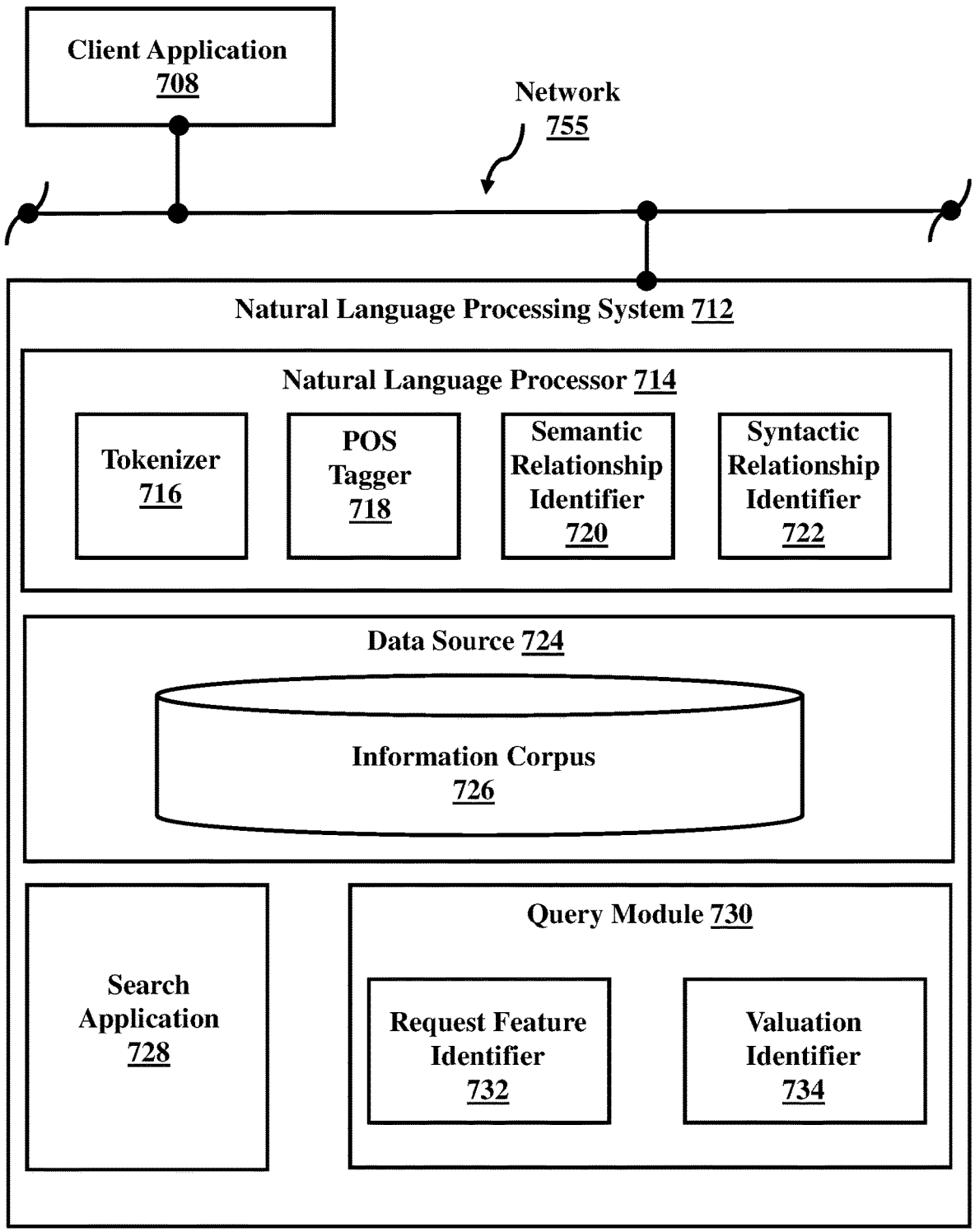
FIG. 7 depicts a block diagram of an example natural language processing system configured to analyze a recording to identify a particular subject of a query, in accordance with embodiments of the present disclosure.

Referring now to FIG. 7, shown is a block diagram of an exemplary system architecture 700 including a natural language processing system 712 configured to analyze data to identify objects of interest (e.g., possible anomalies, natural data, etc.), in accordance with embodiments of the present disclosure. In some embodiments, a remote device (such as remote device 602 of FIG. 6) may submit a text segment and/or a corpus to be analyzed to the natural language processing system 712 which may be housed on a host device (such as host device 622 of FIG. 6). Such a remote device may include a client application 708, which may itself involve one or more entities operable to generate or modify information associated with the recording and/or query that is then dispatched to a natural language processing system 712 via a network 755.

Consistent with various embodiments of the present disclosure, the natural language processing system 712 may respond to text segment and corpus submissions sent by a client application 708. Specifically, the natural language processing system 712 may analyze a received text segment and/or corpus (e.g., video, news article, etc.) to identify an object of interest. In some embodiments, the natural language processing system 712 may include a natural language processor 714, data sources 724, a search application 728, and a query module 730. The natural language processor 714 may be a computer module that analyzes the recording and the query. The natural language processor 714 may perform various methods and techniques for analyzing recordings and/or queries (e.g., syntactic analysis, semantic analysis, etc.). The natural language processor 714 may be configured to recognize and analyze any number of natural languages. In some embodiments, the natural language processor 714 may group one or more sections of a text into one or more subdivisions. Further, the natural language processor 714 may include various modules to perform analyses of text or other forms of data (e.g., recordings, etc.). These modules may include, but are not limited to, a tokenizer 716, a part-of-speech (POS) tagger 718 (e.g., which may tag each of the one or more sections of text in which the particular object of interest is identified), a semantic relationship identifier 720, and a syntactic relationship identifier 722.

In some embodiments, the tokenizer 716 may be a computer module that performs lexical analysis. The tokenizer 716 may convert a sequence of characters (e.g., images, sounds, etc.) into a sequence of tokens. A token may be a string of characters included in a recording and categorized as a meaningful symbol. Further, in some embodiments, the tokenizer 716 may identify word boundaries in a body of text and break any text within the body of text into their component text elements, such as words, multiword tokens, numbers, and punctuation marks. In some embodiments, the tokenizer 716 may receive a string of characters, identify the lexemes in the string, and categorize them into tokens.

Consistent with various embodiments, the POS tagger 718 may be a computer module that marks up a word in a recording to correspond to a particular part of speech. The POS tagger 718 may read a passage or other text in natural language and assign a part of speech to each word or other token. The POS tagger 718 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed body of texts and/or corpora (e.g., the content of one text segment may shed light on the meaning of one or more objects of interest in another text segment). Examples of parts of speech that may be assigned to words include, but are not limited to, nouns, verbs, adjectives, adverbs, and the like. Examples of other part of speech categories that POS tagger 718 may assign include, but are not limited to, comparative or superlative adverbs, wh-adverbs, conjunctions, determiners, negative particles, possessive markers, prepositions, wh-pronouns, and the like. In some embodiments, the POS tagger 718 may tag or otherwise annotate tokens of a recording with part of speech categories. In some embodiments, the POS tagger 718 may tag tokens or words of a recording to be parsed by the natural language processing system 712.

In some embodiments, the semantic relationship identifier 720 may be a computer module that may be configured to identify semantic relationships of recognized subjects (e.g., words, phrases, images, etc.) in a body of text/corpus. In some embodiments, the semantic relationship identifier 720 may determine functional dependencies between entities and other semantic relationships.

Consistent with various embodiments, the syntactic relationship identifier 722 may be a computer module that may be configured to identify syntactic relationships in a body of text/corpus composed of tokens. The syntactic relationship identifier 722 may determine the grammatical structure of sentences such as, for example, which groups of words are associated as phrases and which word is the subject or object of a verb. The syntactic relationship identifier 722 may conform to formal grammar.

In some embodiments, the natural language processor 714 may be a computer module that may group sections of a recording into subdivisions and generate corresponding data structures for one or more subdivisions of the recording. For example, in response to receiving a text segment at the natural language processing system 712, the natural language processor 714 may output subdivisions of the text segment as data structures. In some embodiments, a subdivision may be represented in the form of a graph structure. To generate the subdivision, the natural language processor 714 may trigger computer modules 716-722.

In some embodiments, the output of natural language processor 714 may be used by search application 728 to perform a search of a set of (i.e., one or more) corpora to retrieve one or more subdivisions including a particular subject associated with a query (e.g., in regard to an object of interest) and send the output to an image processing system and to a comparator. As used herein, a corpus may refer to one or more data sources, such as a data source 724 of FIG. 7. In some embodiments, data sources 724 may include video libraries, data warehouses, information corpora, data models, and/or document repositories. In some embodiments, the data sources 724 may include an information corpus 726. The information corpus 726 may enable data storage and retrieval. In some embodiments, the information corpus 726 may be a subject repository that houses a standardized, consistent, clean, and integrated list of images and text. For example, an information corpus 726 may include teaching presentations that include step by step images and comments on how to perform a function. Data may be sourced from various operational systems. Data stored in an information corpus 726 may be structured in a way to specifically address reporting and analytic requirements. In some embodiments, an information corpus 726 may be a relational database.

In some embodiments, a query module 730 may be a computer module that identifies objects of interest within sections of a text, or other forms of data. In some embodiments, a query module 730 may include a request feature identifier 732 and a valuation identifier 734. When a query is received by the natural language processing system 712, the query module 730 may be configured to analyze text using natural language processing to identify an object of interest. The query module 730 may first identity one or more objects of interest in the text using the natural language processor 714 and related subcomponents 716-722. After identifying the one or more objects of interest, the request feature identifier 732 may identify one or more common objects of interest (e.g., anomalies, artificial content, natural data, etc.) present in sections of the text (e.g., the one or more text segments of the text). In some embodiments, the common objects of interest in the sections may be the same object of interest that is identified. Once a common object of interest is identified, the request feature identifier 732 may be configured to transmit the text segments that include the common object of interest to an image processing system (shown in FIG. 6) and/or to a comparator.

After identifying common objects of interest using the request feature identifier 732, the query module may group sections of text having common objects of interest. The valuation identifier 734 may then provide a value to each text segment indicating how close the object of interest in each text segment is related to one another (and thus indicates artificial and/or real data). In some embodiments, the particular subject may have one or more of the common objects of interest identified in the one or more sections of text. After identifying a particular object of interest relating to the query (e.g., identifying that one or more of the common objects of interest may be an anomaly), the valuation identifier 734 may be configured to transmit the criterion to an image processing system (shown in FIG. 6) and/or to a comparator (which may then determine the validity of the common and/or particular objects of interest).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
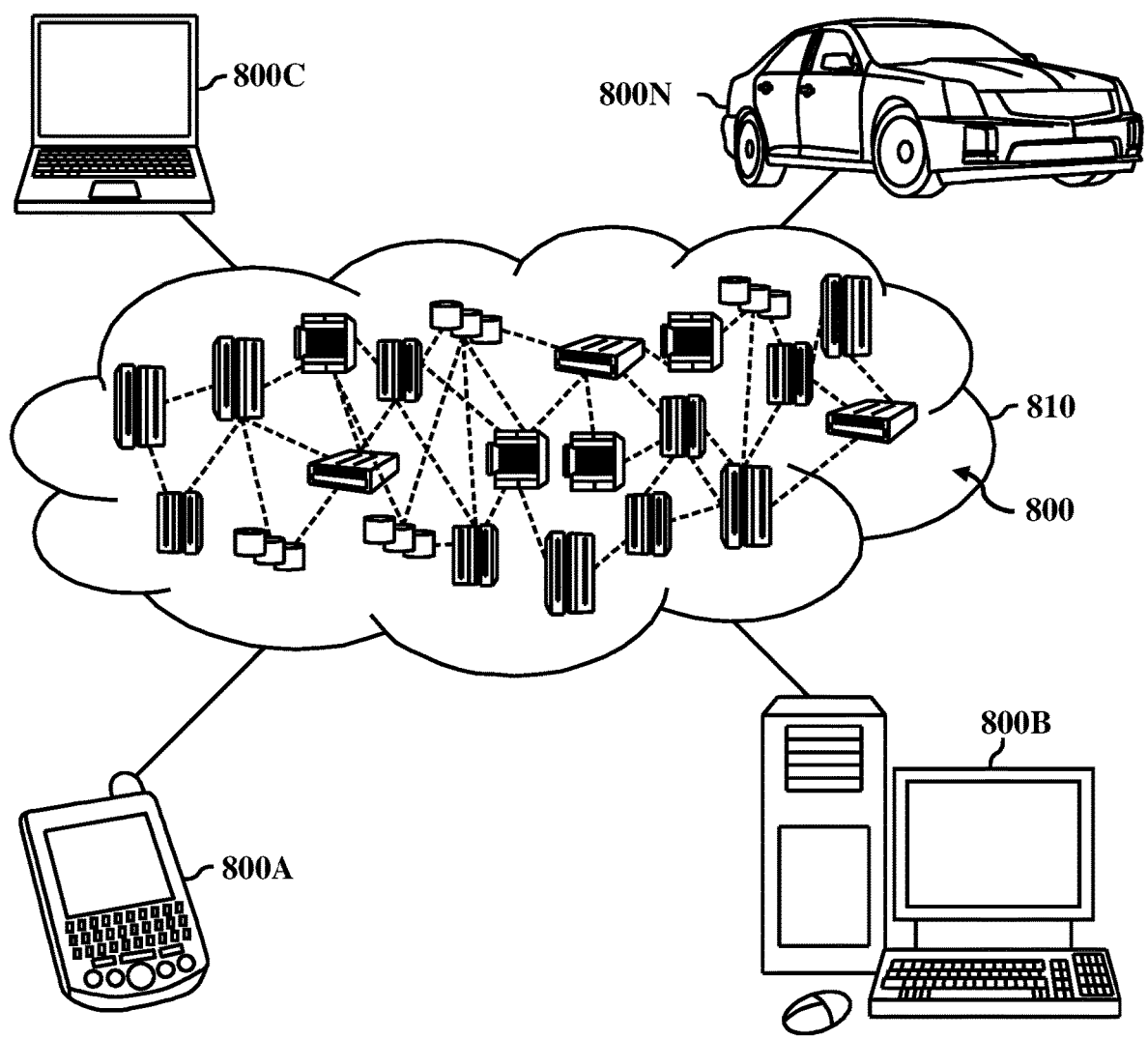
FIG. 8 illustrates a cloud computing environment in accordance with embodiments of the present disclosure.

FIG. 8 illustrates a cloud computing environment 810 in accordance with embodiments of the present disclosure. As shown, cloud computing environment 810 includes one or more cloud computing nodes 800 with which local computing devices used by cloud consumers such as, for example, personal digital assistant (PDA) or cellular telephone 800A, desktop computer 800B, laptop computer 800C, and/or automobile computer system 800N may communicate. Nodes 800 may communicate with one another. They may be grouped (not shown) physically or virtually, in one or more networks, such as private, community, public, or hybrid clouds as described hereinabove, or a combination thereof.

This allows cloud computing environment 810 to offer infrastructure, platforms, and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
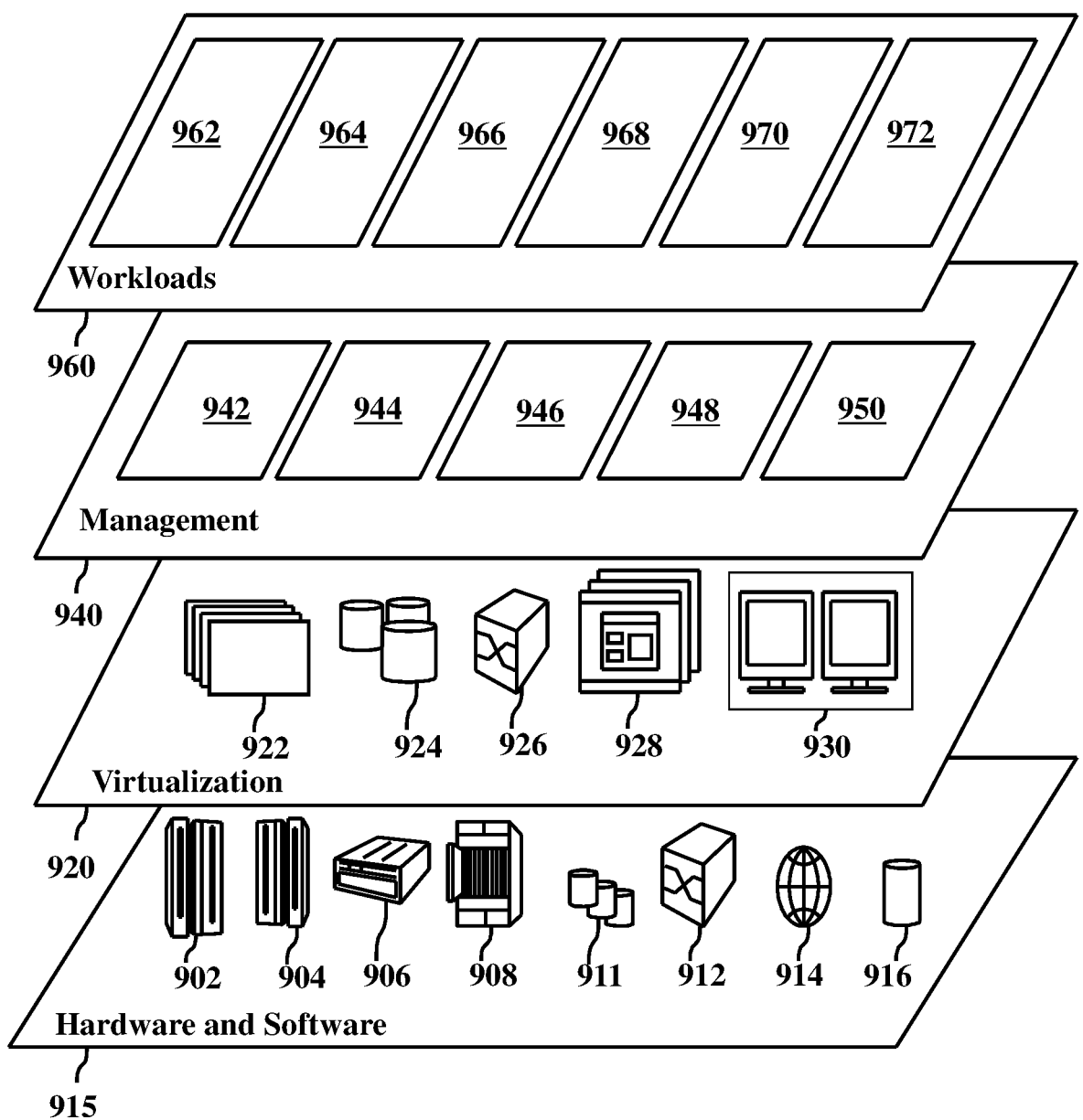
FIG. 9 depicts abstraction model layers in accordance with embodiments of the present disclosure.

FIG. 9 illustrates abstraction model layers 900 provided by cloud computing environment 810 (FIG. 8) in accordance with embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 915 includes hardware and software components. Examples of hardware components include: mainframes 902; RISC (Reduced Instruction Set Computer) architecture-based servers 904; servers 906; blade servers 908; storage devices 911; and networks and networking components 912. In some embodiments, software components include network application server software 914 and database software 916.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 940 may provide the functions described below. Resource provisioning 942 provides dynamic procurement of computing resources and other resources that are utilized to perform tasks within the cloud computing environment. Metering and pricing 944 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 946 provides access to the cloud computing environment for consumers and system administrators. Service level management 948 provides cloud computing resource allocation and management such that required service levels are met. Service level agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment may be utilized. Examples of workloads and functions which may be provided from this layer include: mapping and navigation 962; software development and lifecycle management 964; virtual classroom education delivery 966; data analytics processing 968; transaction processing 970; and bootstrapping dynamic orchestration workflow for stateful automation tasks 972.

Figure 10:
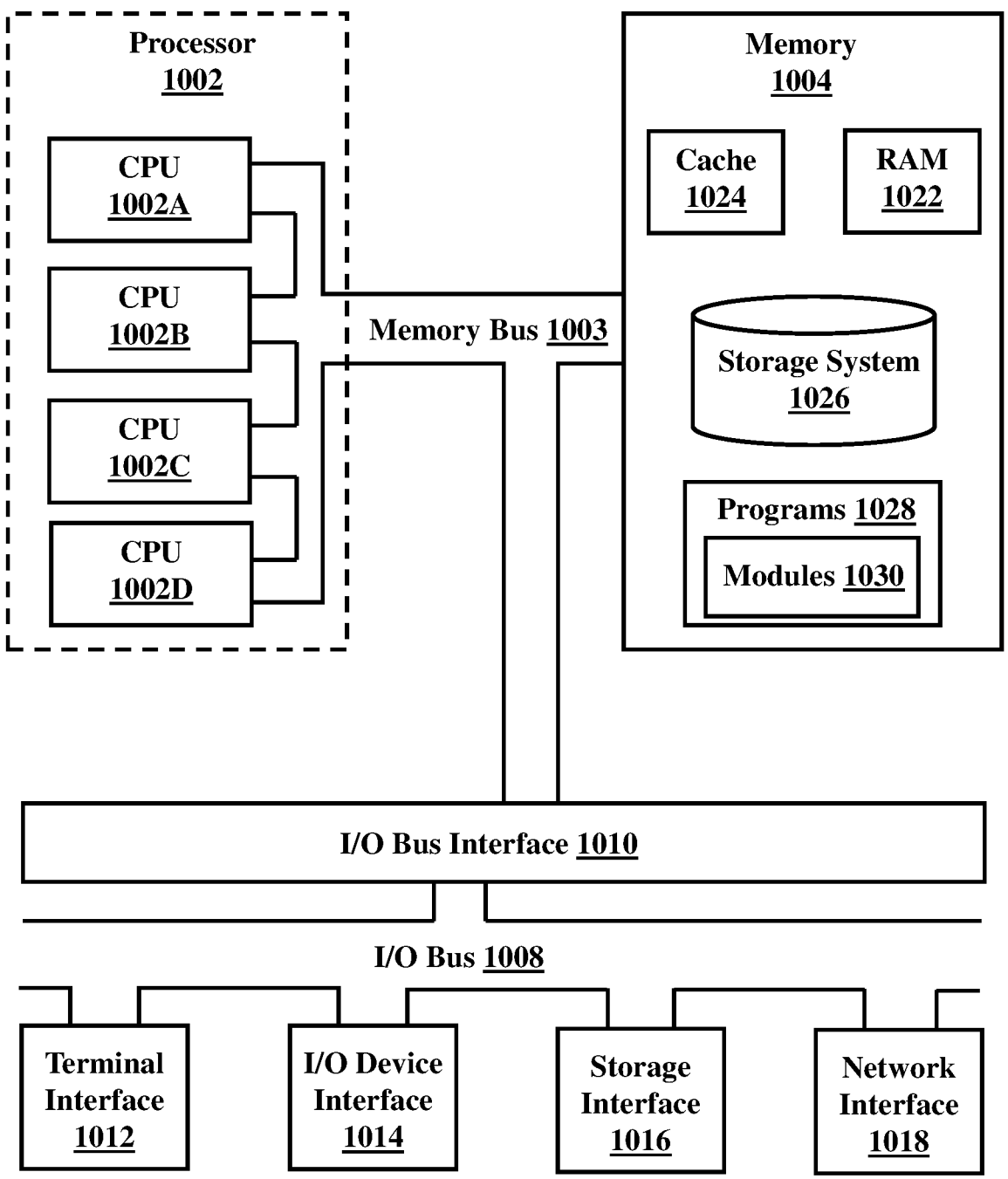
FIG. 10 illustrates a high-level block diagram of an example computer system that may be used in implementing one or more of the methods, tools, and modules, and any related functions, described herein, in accordance with embodiments of the present disclosure.

FIG. 10 illustrates a high-level block diagram of an example computer system 1001 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1001 may comprise a processor 1002 with one or more central processing units (CPUs) 1002A, 1002B, 1002C, and 1002D, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable CPUs 1002A, 1002B, 1002C, and 1002D, herein generically referred to as the CPU 1002. In some embodiments, the computer system 1001 may contain multiple processors typical of a relatively large system; however, in other embodiments, the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030, may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units 1010 are shown, which separate the I/O bus 1008 from various communications paths running to the various I/O devices, in other embodiments some or all of the I/O devices may be connected directly to one or more system I/O buses 1008.

In some embodiments, the computer system 1001 may be a multi-user mainframe computer system, a single-user system, a server computer, or similar device that has little or no direct user interface but receives requests from other computer systems (clients). Further, in some embodiments, the computer system 1001 may be implemented as a desktop computer, portable computer, laptop or notebook computer, tablet computer, pocket computer, telephone, smartphone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
   a memory; and
   a processor in communication with said memory, said processor being configured to perform operations, said operations comprising:
   receiving data;
   generating a contextual execution dependency graph with said data;
   developing an automation script using said contextual execution dependency graph;
   producing a declarative automation agent with said data;
   calculating an agent sequence for said declarative automation agent based at least in part on said contextual execution dependency graph;
   receiving a request;
   determining a prerequisite subtask based on said contextual execution dependency graph;
   performing said prerequisite subtask with said declarative automation agent; and
   executing said automation script with said declarative automation agent, wherein said declarative automation agent uses said agent sequence and said contextual execution dependency graph.

2. The system of claim 1, wherein:
   said automation script is a stateful execution automation script.

3. The system of claim 1, said operations further comprising:
   deriving declarative automation scripts from execution logs; and
   including said declarative automation scripts in said data.

4. The system of claim 1, said producing said declarative automation agent further comprising:
   identifying intent, entities, and sample utterances in a source, wherein said source includes at least one from the group consisting of artifacts, script comments, and artificial intelligence discovery information.

5. The system of claim 1, said operations further comprising:
   identifying intent in a request; and
   matching said intent to said declarative automation agent based on said contextual execution dependency graph.

6. The system of claim 1, said operations further comprising:
   correlating a sequence of state transitions with said agent sequence.

7. The system of claim 1, said operations further comprising:
   constructing a payload based on domain knowledge.

8. A computer-implemented method, said computer-implemented method comprising:
   receiving data;
   generating a contextual execution dependency graph with said data;
   developing an automation script using said contextual execution dependency graph;
   producing a declarative automation agent with said data;
   calculating an agent sequence for said declarative automation agent based at least in part on said contextual execution dependency graph;
   receiving a request;
   determining a prerequisite subtask based on said contextual execution dependency graph;
   performing said prerequisite subtask with said declarative automation agent; and
   executing said automation script with said declarative automation agent, wherein said declarative automation agent uses said agent sequence and said contextual execution dependency graph.

9. The computer-implemented method of claim 8, wherein:

said automation script is a stateful execution automation script.

10. The computer-implemented method of claim 8, further comprising:
deriving declarative automation scripts from execution logs; and
including said declarative automation scripts in said data.

11. The computer-implemented method of claim 8, said producing said declarative automation agent further comprising:
identifying intent, entities, and sample utterances in a source, wherein said source includes at least one from the group consisting of artifacts, script comments, and artificial intelligence discovery information.

12. The computer-implemented method of claim 8, further comprising:
constructing a skills pipeline for said declarative automation agent.

13. The computer-implemented method of claim 8, further comprising:
identifying intent in said request; and
matching said intent to said declarative automation agent based on said contextual execution dependency graph.

14. The computer-implemented method of claim 8, further comprising:
correlating a sequence of state transitions with said agent sequence.

15. The computer-implemented method of claim 8, further comprising:
constructing a payload based on domain knowledge.

16. A method for dynamic orchestration workflow comprising:
receiving an input;
identifying an intent sample, an entity sample, and a sample utterance in said input;
generating, automatically, an executional dependency graph based on said input;
developing, automatically, an automation script using said executional dependency graph;
calculating a sequence for a task with said executional dependency graph;
determining a prerequisite subtask based on said executional dependency graph;
generating, automatically, a declarative automation agent for said task based on said input;
performing said prerequisite subtask with said declarative automation agent; and
executing said task with said declarative automation agent via said sequence.

17. The method of claim 16, further comprising:
deriving said executional dependency graph from variant-based process mining of an executed automation script sequence.

18. The method of claim 16, further comprising:
examining a script; and
using said script to generate said declarative automation agent.

19. The method of claim 16, further comprising:
identifying a request intent, a request entity, and a request utterance in a request;
identifying a requested task for said declarative automation agent based on said request intent, said request entity, and said request utterance.

20. The method of claim 16, wherein:
said input includes an automation script; and
said executional dependency graph is generated from said automation script.

* * * * *